(12) United States Patent
Shingu

(10) Patent No.: US 9,942,471 B2
(45) Date of Patent: Apr. 10, 2018

(54) INFORMATION PROCESSING APPARATUS, INFORMATION PROCESSING SYSTEM AND NON-TRANSITORY COMPUTER READABLE MEDIUM

(71) Applicant: FUJI XEROX CO., LTD., Tokyo (JP)

(72) Inventor: Jun Shingu, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 39 days.

(21) Appl. No.: 14/656,227

(22) Filed: Mar. 12, 2015

(65) Prior Publication Data

US 2015/0189170 A1 Jul. 2, 2015

Related U.S. Application Data

(63) Continuation of application No. PCT/JP2013/068352, filed on Jul. 4, 2013.

(30) Foreign Application Priority Data

Oct. 5, 2012 (JP) .................................. 2012-223214

(51) Int. Cl.
*H04N 5/228* (2006.01)
*H04N 5/232* (2006.01)
(Continued)

(52) U.S. Cl.
CPC ... *H04N 5/23222* (2013.01); *G08B 13/19641* (2013.01); *G08B 13/19645* (2013.01); *H04N 5/247* (2013.01); *G08B 13/19608* (2013.01)

(58) Field of Classification Search
None
See application file for complete search history.

(56) References Cited

U.S. PATENT DOCUMENTS

| 7,193,645 B1* | 3/2007 | Aagaard | H04N 5/222 348/157 |
| 2002/0052708 A1* | 5/2002 | Pollard | H04N 7/181 702/151 |

(Continued)

FOREIGN PATENT DOCUMENTS

| JP | 09016863 A | 1/1997 |
| JP | 2002-077889 A | 3/2002 |

(Continued)

OTHER PUBLICATIONS

Communication dated Aug. 6, 2013 by the International Searching Authority in related Application No. PCT/JP2013/068352.

(Continued)

*Primary Examiner* — Twyler Haskins
*Assistant Examiner* — Wesley Chiu
(74) *Attorney, Agent, or Firm* — Sughrue Mion, PLLC

(57) ABSTRACT

An information processing apparatus includes: an expectation condition information acquisition section; a requisite condition information acquisition section; a photographing apparatus state information acquisition section; an object state information acquisition section; and a photographing apparatus selection section as defined herein, the requisite condition requires that the plurality of objects are not overlapped with each other, and the photographing apparatus selection section has: an expectation condition determination section that carries out expectation condition determination processing to determine whether a photographic image captured by each of the plurality of photographing apparatuses satisfies at least one of the plurality of expectation conditions or not; and a requisite condition determination section that carries out requisite condition determination processing to determine whether or not a photographic image that has been determined to satisfy at least one of the plurality of expectation conditions by the (Continued)

expectation condition determination section satisfies the requisite condition.

12 Claims, 6 Drawing Sheets

(51) Int. Cl.
*G08B 13/196* (2006.01)
*H04N 5/247* (2006.01)

(56) References Cited

U.S. PATENT DOCUMENTS

| | | | | |
|---|---|---|---|---|
| 2006/0012681 | A1* | 1/2006 | Fujii | H04N 7/181 |
| | | | | 348/169 |
| 2008/0043113 | A1* | 2/2008 | Ishii | G06T 3/4038 |
| | | | | 348/218.1 |
| 2009/0096871 | A1* | 4/2009 | Kuwano | G06K 9/00228 |
| | | | | 348/169 |
| 2010/0002082 | A1* | 1/2010 | Buehler | G08B 13/19693 |
| | | | | 348/159 |
| 2012/0069210 | A1* | 3/2012 | Miyata | H04N 5/232 |
| | | | | 348/222.1 |

FOREIGN PATENT DOCUMENTS

| | | |
|---|---|---|
| JP | 2005-286419 A | 10/2005 |
| JP | 2006-081128 A | 3/2006 |
| JP | 2008-072702 A | 3/2008 |
| JP | 2009-071344 A | 4/2009 |

OTHER PUBLICATIONS

ISR (PCT/ISA/210) dated Aug. 6, 2013, in related International Application No. PCT/JP2013/068352.

Written Opinion (PCT/ISA/237) dated Aug. 6, 2013, in related International Application No. PCT/JP2013/068352.

Communication from the Japanese Patent Office dated May 31, 2016 in a counterpart Japanese application No. 2012-223214.

* cited by examiner

| PRIORITIES | EXPECTATION CONDITIONS |
|---|---|
| 1 | PHOTOGRAPH OBJECT 510 |
| 2 | ANGLE WITH RESPECT TO ORIENTATION OF OBJECT 520 IS 90 DEGREES OR LESS |
| 3 | HORIZONTAL WIDTH OF OBJECT 520 IS 1 m OR MORE |

| REQUISITE CONDITION |
|---|
| OBJECT IS WITHIN ANGLE OF VIEW |
| NO OVERLAP BETWEEN OBJECTS |

FIG. 7

| CONDITION NUMBER | EXPECTATION CONDITIONS | WEIGHTING (POINT) | PHOTOGRAPHING APPARATUS A | PHOTOGRAPHING APPARATUS B |
|---|---|---|---|---|
| 1 | PHOTOGRAPH WITH OBJECT b | 10 | UNAVAILABLE (10×0 = 0 POINTS) | AVAILABLE (10×1 = 10 POINTS) |
| 2 | ANGLE BETWEEN ORIENTATION VECTOR OF OBJECT c AND PHOTOGRAPHING DIRECTION IS SMALL | 6 | 30 DEGREES (6×(180−30)/180 = 5 POINTS) | 60 DEGREES (6×(180−60)/180 = 4 POINTS) |
| 3 | WIDTH OF OBJECT c IS 1 m AND OVER | 2 | AVAILABLE (2×1 = 2 POINTS) | UNAVAILABLE (2×0 = 0 POINTS) |
| POINT TOTAL | | | 7 POINTS | 14 POINTS |

FIG. 8

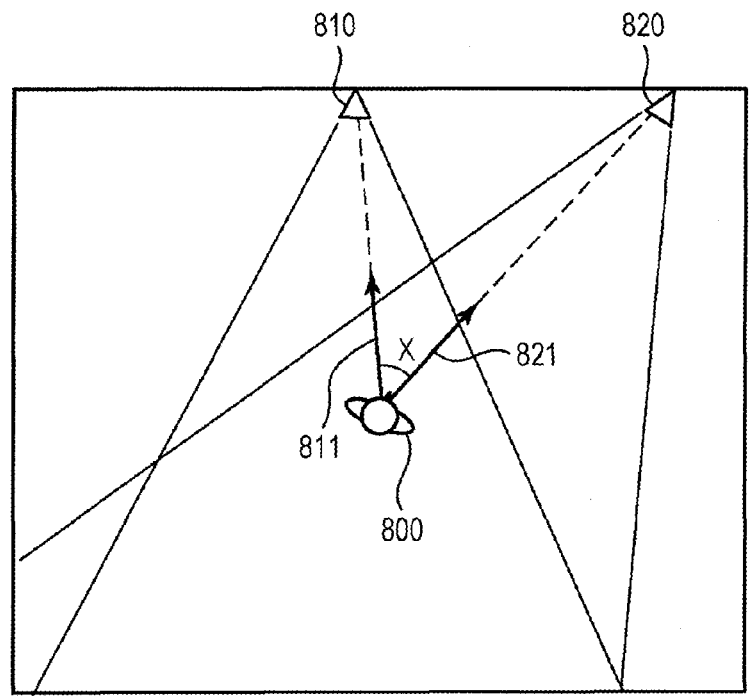

INFORMATION PROCESSING APPARATUS, INFORMATION PROCESSING SYSTEM AND NON-TRANSITORY COMPUTER READABLE MEDIUM

CROSS REFERENCE TO RELATED APPLICATION

This is a continuation of International Application No. PCT/JP2013/068352 filed on Jul. 4, 2013, and claims priority from Japanese Patent Application No. 2012-223214, filed on Oct. 5, 2012.

TECHNICAL FIELD

The present invention relates to an information processing apparatus, an information processing system and a non-transitory computer readable medium.

SUMMARY OF INVENTION

According to an aspect of the invention, there is provided an information processing apparatus comprising: an expectation condition information acquisition section that acquires expectation condition information which indicates a plurality of expectation conditions for a photographic image; a requisite condition information acquisition section that acquires requisite condition information which indicates a requisite condition for the photographic image; a photographing apparatus state information acquisition section that acquires photographing apparatus state information including information which indicates positions and orientations of a plurality of photographing apparatuses; an object state information acquisition section that acquires object state information including information which indicates positions of a plurality of objects; and a photographing apparatus selection section that selects one or more of the plurality of photographing apparatuses which capture the photographic image on the basis of the expectation condition information, the requisite condition information, the photographing apparatus state information and the object state information, wherein the requisite condition requires that the plurality of objects are not overlapped with each other, and the photographing apparatus selection section has: an expectation condition determination section that carries out expectation condition determination processing to determine whether a photographic image captured by each of the plurality of photographing apparatuses satisfies at least one of the plurality of expectation conditions or not; and a requisite condition determination section that carries out requisite condition determination processing to determine whether or not a photographic image that has been determined to satisfy at least one of the plurality of expectation conditions by the expectation condition determination section satisfies the requisite condition.

BRIEF DESCRIPTION OF DRAWINGS

FIG. 7 illustrates an example of expectation conditions and expectation condition determination processing of the embodiment of the invention.

FIG. 8 explains an example of expectation conditions of the embodiment of the invention.

Figure 1:
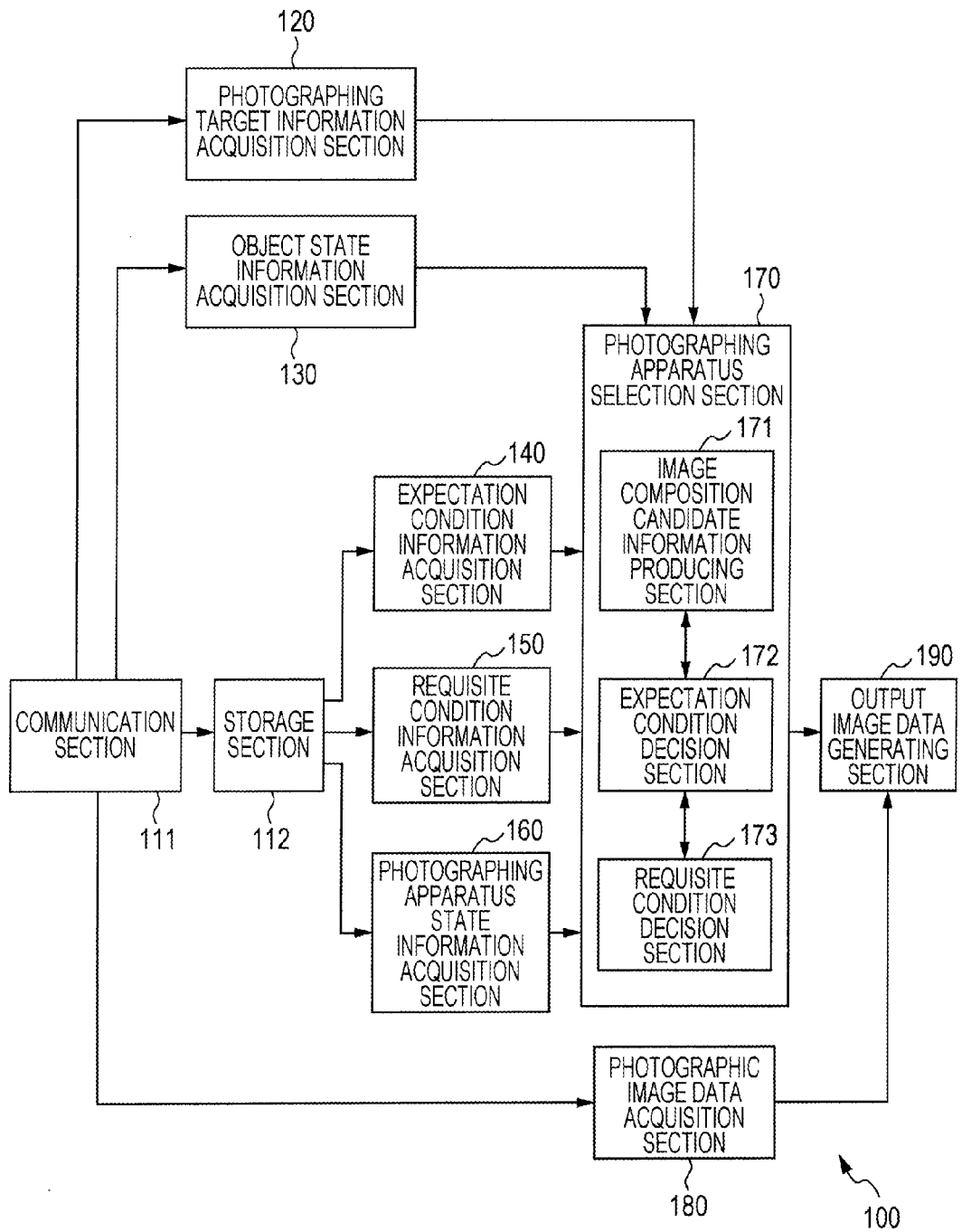
FIG. 1 illustrates an information processing apparatus of an embodiment of the invention.

REFERENCE SIGNS LIST 100 information processing apparatus
111 communication section
112 storage section
120 photographing target information acquisition section
130 object state information acquisition section
140 expectation condition information acquisition section
150 requisite condition information acquisition section
160 photographing apparatus state information acquisition section
170 photographing apparatus selection section
171 image composition candidate information producing section
172 expectation condition determination section
173 requisite condition determination section
180 photographic image data acquisition section
190 output image data generating section
200, 300, 400, 810, 820, 910, 920, 930, 940 photographing apparatus
210, 310, 410 image composition
220, 320, 420 image composition candidate
500, 510, 520, 800 object
811, 821 arrow
900 room

DESCRIPTION OF EMBODIMENTS

FIG. 1 illustrates an information processing apparatus 100 of an embodiment of the invention. The information processing apparatus 100 is connected to a plurality of photographing apparatuses 200, 300 and 400 which are not illustrated, and generates output image data on the basis of photographic image data sent from these plural information processing apparatuses 200, 300 and 400.

Figures 2, 3:
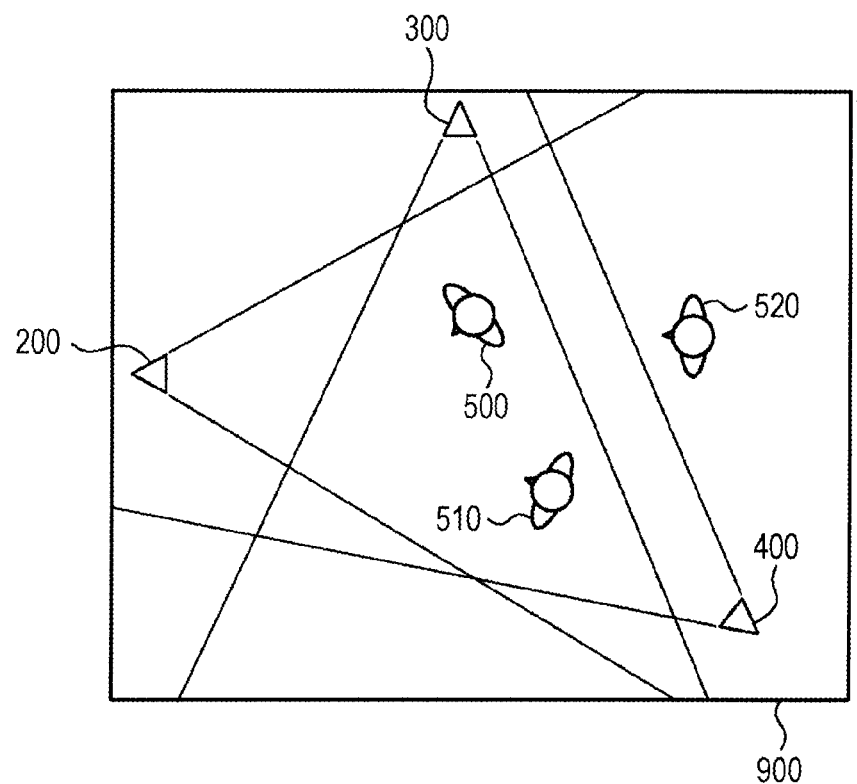
FIG. 2 illustrates data processing to be carried out by the information processing apparatus of the embodiment.
FIG. 3 illustrates exemplary expectation conditions.

FIG. 2 illustrates data processing to be carried out by the information processing apparatus 100 of the embodiment. FIG. 2 is a top view of a certain room 900. The plural information processing apparatuses 200, 300 and 400 to be coupled with the information processing apparatus 100 are fixed and installed in the room 900, and take photographs of objects 500, 510 and 520 so as to generate photographic image data. The objects 500, 510 and 520 mentioned here are humans.

The information processing apparatus 100 selects at least one of the plural information processing apparatuses 200, 300 and 400 which takes a photograph for photographic image data to be used for generating the output image data on the basis of preset expectation conditions and a requisite condition.

The information processing apparatus 100 has a communication section 111, a storage section 112, a photographing target information acquisition section 120, an object state information acquisition section 130, an expectation condition information acquisition section 140, a requisite condition information acquisition section 150, a photographing apparatus state information acquisition section 160, a photographing apparatus selection section 170, a photographic image data acquisition section 180 and an output image data generating section 190. The photographing apparatus selection section 170 further has an image composition candidate information producing section 171, an expectation condition determination section 172 and a requisite condition determination section 173. The communication section 111, the photographing target information acquisition section 120, the object state information acquisition section 130, the expectation condition information acquisition section 140, the requisite condition information acquisition section 150, the photographing apparatus state information acquisition section 160, the photographing apparatus selection section 170, the photographic image data acquisition section 180 and the output image data generating section 190 are implemented, e.g., as a function of a CPU, and the storage section 112 is implemented by a storage element such as a memory, etc.

The communication section 111 communicates with the plural photographing apparatuses 200, 300 and 400 and a managing apparatus which is not illustrated, etc., extracts various kinds of data from received communication data, and provides the photographing target information acquisition section 120, the object state information acquisition section 130, the storage section 112 and the photographic image data acquisition section 180, etc., with the extracted data.

The storage section 112 stores expectation condition information, requisite condition information and photographing apparatus state information, etc., provided by the communication section 111 which will be described later.

The photographing target information acquisition section 120 acquires photographing target information to specify an object to be photographed. The photographing target information is acquired by the use of a known method such that, e.g., an image photographed by one of the photographing apparatuses 200, 300 and 400 is displayed on a touch panel of the managing apparatus which is not illustrated, etc., and that an operation to touch an object to be photographed (e.g., one of the objects 500, 510 and 520) on the touch panel is carried out by an administrator, and is acquired via the communication section 111.

The object state information acquisition section 130 acquires object state information including information on positions and orientations of the objects 500, 510 and 520. The object state information is successively acquired, e.g., in a form of 3D coordinates by means of known measurement and image recognition technologies, and is acquired via the communication section 111.

The expectation condition information acquisition section 140 acquires expectation condition information which indicates a plurality of expectation conditions for output image data preset by the administrator and stored in the storage section 112. FIG. 3 illustrates exemplary expectation conditions. The expectation conditions are conditions to be desirably satisfied in the output image data produced by the information processing apparatus 100, and priorities are set for the respective conditions by the administrator. That is, if an image which satisfies the expectation condition of the top priority (top expectation condition, hereafter) cannot be produced and an image which satisfies the expectation condition of the next top priority can be produced, the image which satisfies the next top expectation condition is produced.

Figures 4, 5:
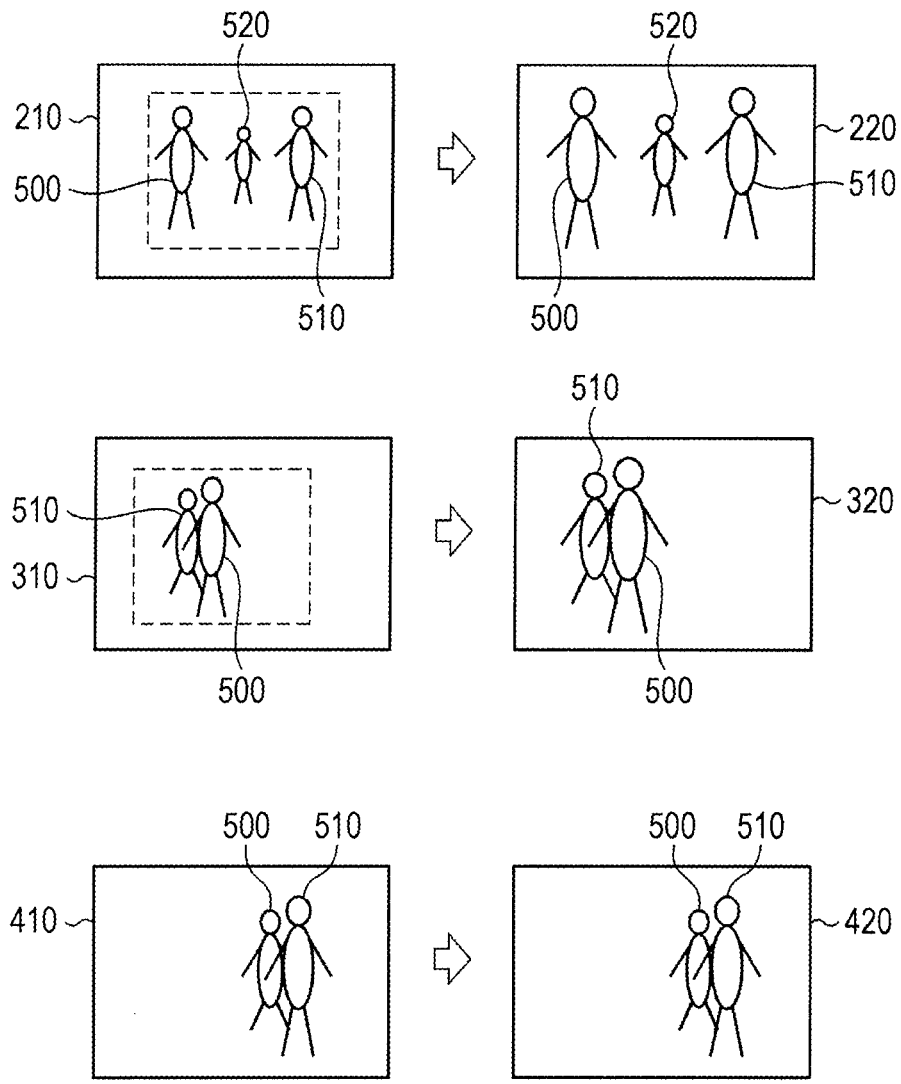
FIG. 4 illustrates an exemplary requisite condition.
FIG. 5 illustrates exemplary content of image forming information produced by the image forming information candidate producing section.

The requisite condition information acquisition section 150 acquires requisite condition information which indicates a requisite condition for output image data preset by the administrator and stored in the storage section 112. FIG. 4 illustrates an exemplary requisite condition. The requisite condition is a condition to be fully satisfied in an image produced by the information processing apparatus 100.

The photographing apparatus state information acquisition section 160 acquires photographing apparatus state information including information on installation positions and orientations for taking photographs of the photographing apparatuses 200, 300 and 400. The photographing apparatus state information indicates installation positions represented by 3D coordinates and orientations for taking photographs represented by vectors of the photographing apparatuses 200, 300 and 400, and is acquired in advance by means of measurement by GPS functions of the photographing apparatuses 200, 300 and 400 or a setting operation by the administrator, and is stored in the storage section 112.

The photographing apparatus selection section 170 selects at least one photographing apparatus to be used for generating output image data from the photographing apparatuses 200, 300 and 400 on the basis of the expectation condition information, the requisite condition information, the photographing apparatus state information, the photographing target information and the object state information. The photographing apparatus selection section 170 includes the image composition candidate composition candidate information producing section 171, the expectation condition determination section 172 and the requisite condition determination section 173. An operation of the photographing apparatus selection section 170 will be explained in detail below.

The image composition candidate composition candidate information producing section 171 of the photographing apparatus selection section 170 produces image composition candidate composition candidate information which indicates object arrangements, etc., in an image cut off from photographic images captured by the photographing apparatuses 200, 300 and 400 in such a way as to satisfy the expectation conditions on the basis of the photographing target information, the object state information, the expectation condition information and the photographing apparatus state information. The image composition candidate information producing section 171 produces image composition candidate information for each of the photographing apparatuses 200, 300 and 400 on the basis of the expectation condition of the top priority (top expectation condition) at first.

The expectation condition determination section 172 of the photographing apparatus selection section 170 carries out expectation condition determination processing to determine whether each piece of the image composition candidate information which indicates forms of photographic images captured by the photographing apparatuses 200, 300 and 400 and which is generated by the image composition candidate information producing section 171 satisfies the expectation conditions. The expectation condition determination section 172 carries out expectation condition determination processing to determine whether each piece of the image candidate forming information satisfies the top expectation condition.

The image composition candidate information that has been determined to satisfy the top expectation condition is subjected to determination processing to determine whether the requisite condition is satisfied (requisite condition determination processing) by the requisite condition determination section 173 described later. If no piece of the image composition candidate information satisfies the requisite condition here, the image composition candidate information producing section 171 and the expectation condition determination section 172 carry out the data processing described above for the next top expectation condition. The image composition candidate information producing section 171 and the expectation condition determination section 172 select the expectation conditions in order of priority to repeat the data processing described above hereafter until a determination that any piece of the image forming information satisfies the requisite condition is made by the requisite condition determination section 173.

The requisite condition determination section 173 of the photographing apparatus selection section 170 carries out the requisite condition determination processing to determine whether or not the image composition candidate information, which represents an image that has been determined to satisfy the expectation condition by the expectation condition determination section 172, satisfies the requisite condition.

If the requisite condition is satisfied, the photographing apparatus selection section 170 identifies the photographing apparatus corresponding to the image composition candidate information that has been determined to satisfy the requisite condition as the photographing apparatus (specified photographing apparatus) which captures photographic image data to be used for producing the output image data, and provides the output image data generating section 190 with specified photographing apparatus assignment information to specify the specified photographing apparatus. Unless the requisite condition is satisfied, the requisite condition determination section 173 notifies the image composition candidate information producing section 171 and the expectation condition determination section 172 of that fact.

The photographic image data acquisition section 180 acquires photographic image data captured by the photographing apparatuses 200, 300 and 400 via the communication section 111, and outputs the acquired data to the output image data generating section 190.

The output image data generating section 190 selects photographic image data captured by the specified photographing apparatus from the photographic image data input by the photographic image data acquisition section 180 on the basis of the specified photographing apparatus assignment information provided by the photographing apparatus selection section 170, and produces output image data from the selected photographic image data.

Then, data processing by means of the photographing apparatus selection section 170 will be specifically explained for the example illustrated in FIG. 2.

To begin with, the image composition candidate information producing section 171 of the photographing apparatus selection section 170 produces image forming information which indicates object arrangements, etc., in images captured by the photographing apparatuses 200, 300 and 400 on the basis of the object state information and the photographing apparatus state information. FIG. 5 illustrates exemplary content (image forming) of the image forming information produced by the image composition candidate information producing section 171.

Then, if the object 500 is specified as the photographing target in accordance with the photographing target information and the expectation condition determination processing is carried out for the top expectation condition "photograph the object 510", the image composition candidate information producing section 171 cuts off a region surrounding the objects 500 and 510 (indicated with dashed lines) from image composition 210 of the image captured by the photographing apparatus 200 and image composition 310 of the image captured by the photographing apparatus 300, so as to produce image composition candidates 220 and 320. Meanwhile, as image composition 410 of an image captured by the photographing apparatus 400 does not include the object 520, the image composition candidate information producing section 171 causes the image composition 410 to be an image composition candidate composition candidate 420 as it is. The image composition candidate information producing section 171 provides the expectation condition determination section 172 with image composition candidate information indicating these image composition candidates 220, 320 and 420.

Then, the expectation condition determination section 172 of the photographing apparatus selection section 170 carries out expectation condition determination processing for each of the image composition candidates 220, 320 and 420 indicated by the image composition candidate information produced by the image composition candidate information producing section 171, and determines that the image composition candidates 220 and 320 satisfy the expectation conditions.

Then, the requisite condition determination section 173 of the photographing apparatus selection section 170 carries out the requisite condition determination processing for the image composition candidates 220 and 320 that have been determined to satisfy the expectation conditions by the expectation condition determination section 172. If a requisite condition such that "the objects are within the view angle" and "the objects do not overlap" is specified, the requisite condition determination section 173 determines that only the image composition candidate composition candidate 220 satisfies the requisite condition, and specifies the photographing apparatus 200 corresponding to the image composition candidate composition candidate 220 as the specified photographing apparatus. Then, the photographing apparatus selection section 170 provides the output image data generating section 190 with specified photographing apparatus assignment information to specify the specified photographing apparatus 200.

Figure 6:
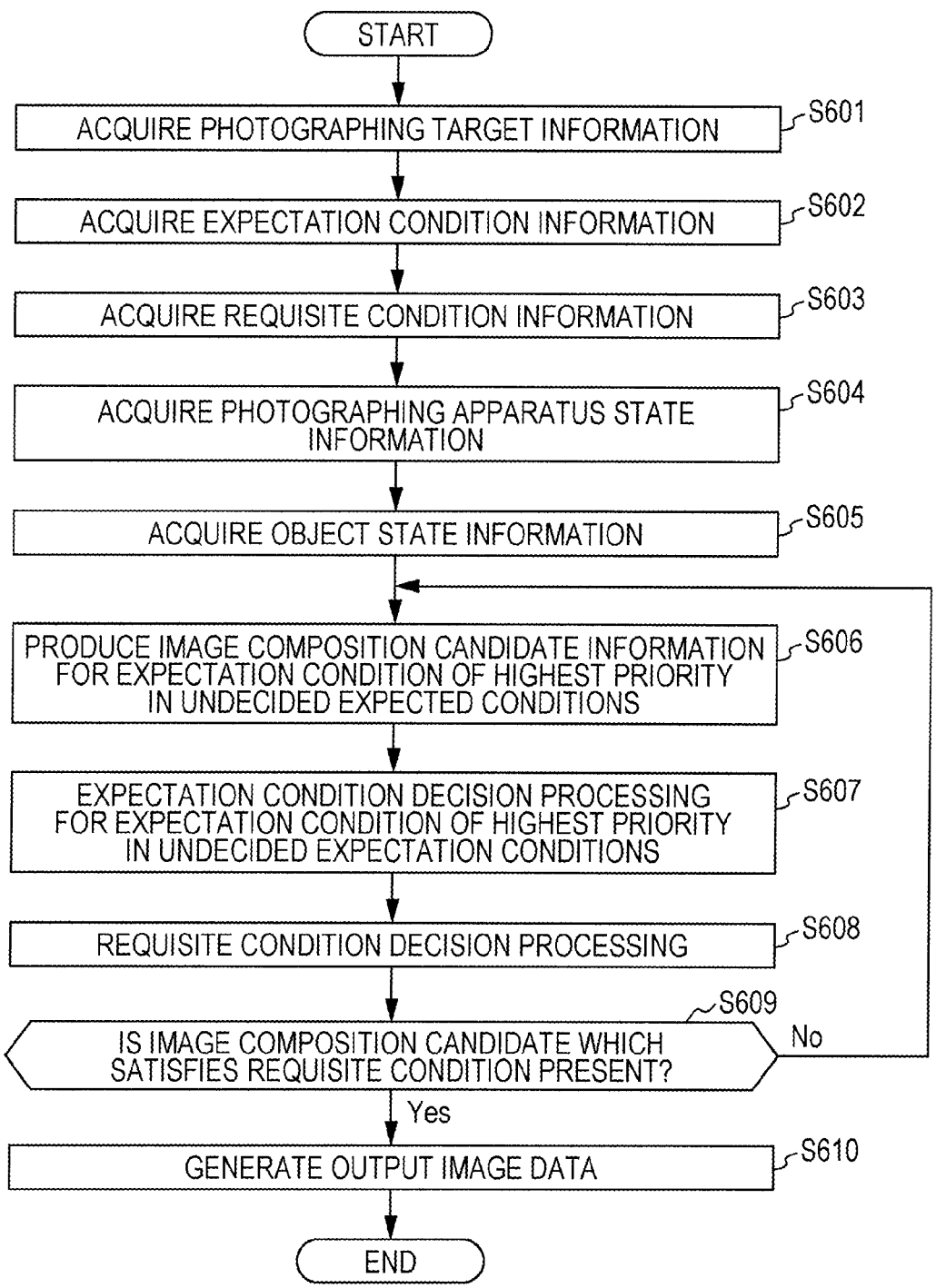
FIG. 6 is a flowchart which indicates image producing processing by the information processing apparatus of the embodiment.

Then, image producing processing on the information processing apparatus 100 will be explained using a flowchart. FIG. 6 is a flowchart which illustrates image generation processing on the information processing apparatus 100 of the embodiment.

The photographing target information acquisition section 120 of the information processing apparatus 100 acquires the photographing target information at first (S601). The expectation condition information acquisition section 140 of the information processing apparatus 100 acquires expectation condition information which indicates a plurality of expectation conditions for output image data (S602).

Then, the requisite condition information acquisition section 150 of the information processing apparatus 100 acquires requisite condition information which indicates a requisite condition for the output image data (S603). The photographing apparatus state information acquisition section 160 of the information processing apparatus 100 acquires photographing apparatus state information which indicates positions and orientations of the plural photographing apparatuses 200, 300 and 400 (S604). The object state information acquisition section 130 of the information processing apparatus 100 acquires object state information including information which indicates object positions (S605).

Then, the image composition candidate information producing section 171 of the photographing apparatus selection section 170 produces image composition candidate information on the basis of the photographing target information acquired at S601, the expectation condition information acquired at S602, the photographing apparatus state information acquired at S604 and the object state information acquired at S605 (S606). Concerning the expectation condition information mentioned here, one of the plural expectation conditions included in the expectation condition information not referred to in the data processing of the steps S606 through S608 (undetermined) having a highest priority is used.

Then, the expectation condition determination section 172 of the photographing apparatus selection section 170 carries out expectation condition determination processing to determine whether each piece of the image composition candidate information produced at S606 satisfies the expectation condition used at S606 (S607).

Then, the requisite condition determination section 173 of the photographing apparatus selection section 170 carries out requisite condition determination processing to determine whether or not the image composition candidate information that has been determined to satisfy at S607 satisfies the requisite condition (S608).

Then, the photographing apparatus selection section 170 refers to whether there is an image composition candidate that has been determined to satisfy the requisite condition at S608 (S609). If there is no image composition candidate that has been determined to satisfy the requisite condition, return to S606.

If there is an image composition candidate that has been determined to satisfy the requisite condition at S608, the output image data generating section 190 produces output image data by using the photographic image data captured by the photographing apparatus corresponding to the relevant image composition candidate information (S610). Then, the image generation processing by the information processing apparatus 100 described above ends.

According to the above configuration, the information processing apparatus 100 configured to select one or more of the plural photographing apparatuses 200, 300 and 400 which capture photographic images satisfying at least one of the plural expectation conditions and the requisite condition is provided.

The embodiment described above indicates a configuration such that the photographing apparatus selection section 170 selects a photographing apparatus on the basis of the expectation condition information, the requisite condition information, the photographing apparatus state information, the photographing target information and the object state information. It is not necessary to use all the information, and, for example, a photographing apparatus may be selected without specifying a particular object (i.e., without using the photographing target information in the above). In this case, every determination processing is carried out for all objects appearing in photographic images captured by the plural photographing apparatuses 200, 300 and 400.

Further, although the embodiment described above indicates a configuration such that the expectation condition determination processing is carried out for all the photographing apparatuses 200, 300 and 400, the invention is not limited to that. For instance, a configuration in which a new means is provided for carrying out the requisite condition determination processing when an image composition or an image composition candidate is produced and in which the following data processing is carried out for only photographing apparatuses which may satisfy the requisite condition. In this case, as unnecessary data processing is cancelled, the data processing load can be reduced and faster data processing is enabled.

Further, although the embodiment described above includes a configuration in which binary determination is used to determine whether expected conditions and a requisite condition are satisfied or are not satisfied, the invention is not limited to such a configuration. For instance, a value may be determined for a certain condition, and determination is performed on the basis of whether the value is not less than or less than a threshold.

Further, although the embodiment described above includes a configuration in which the expectation condition determination section 172 selects a photographing apparatus which satisfies one expectation condition, the invention is not limited to that and a configuration in which a photographing apparatus is selected on the basis of plural expectation conditions is acceptable.

For instance, if there are plural photographing apparatuses satisfying a certain expectation condition, a configuration in which determination is performed for an expectation condition having priority next to the priority of the relevant expectation condition and a photographing apparatus satisfying this expectation condition is selected is acceptable.

Further, a configuration in which points (weightings) are set for plural expectation conditions and the photographing apparatus that has the highest total point value for satisfied expectation conditions is selected is acceptable.

An example of such a configuration will be explained. FIG. 7 illustrates an example of expectation conditions and expectation condition determination processing of an embodiment of the invention. According to the embodiment, three expectation conditions which each have points are set. In addition to expectation conditions (condition numbers 1 and 3) for which binary determination (yes/no) is performed, an expectation condition (condition number 2) for which more points are assigned to higher (lower) points is set here. The expectation condition of the condition number 2 is assumed to be more desirable as the angle is smaller, and all or some of "six" points having been set are added in accordance with the ratio of the obtained angle to 180 degrees. The photographing apparatus B is selected in the example illustrated in FIG. 7.

Although the embodiment described above indicates only a configuration to select one photographing apparatus (image), a configuration in which plural photographing apparatuses are selected one by one is acceptable. This case can include a condition based on a relationship between the object state information and photographing state information of the photographing apparatus selected last as an expectation condition. An example of such an expectation condition will be specifically explained below.

FIG. 8 illustrates an exemplary expectation condition of an embodiment of the invention. Suppose that a photographing apparatus 810 is the last selected one in a configuration in which photographing apparatuses are selected one by one. If a new photographing apparatus is to be selected, an angle between a vector (arrow 811) which goes from an object 800 to the photographing apparatus 810 selected last and a vector which goes from the object 800 to a new photographing apparatus 820 to be selected (angle X) being a predefined value or less can be one of the expectation conditions. According to such a configuration, a change in the appearance of the object 800 (angle with respect to the display face) in the output image data at the time of a changeover in the photographing apparatuses can be suppressed.

Further, in the case of a configuration in which photographing apparatuses are selected one by one, a configuration in which data processing for selecting the photographing apparatuses is carried out if a predefined condition is satisfied is acceptable. Cases where a photographing target is changed (photographing target information is newly acquired), an object position has changed by a predefined value or more, content or priority of the expectation condition is changed, and a predefined lapse of time has passed since the processing for selecting a photographing apparatus was last carried out and so on can each be enumerated as the predefined condition. According to such a configuration, the data processing for selecting a photographing apparatus is carried out only at a proper timing, and effects such as suppression of an increased in load caused by unnecessary selection processing and achievement of a viewer-friendly image owing to proper selection processing can be obtained.

Further, the information processing apparatus 100 of the invention can be applied to a case where a set of output image data is produced from photographic image data already obtained by the photographing apparatuses 200, 300 and 400 and stored. In this case, the configuration described above to use the expectation condition determined in accordance with the relationship with the photographing apparatus selected last can be a configuration in which plural sets of output image data (combinations of selected photographing apparatuses) are generated, in which total point value provided to each set is calculated, in which a combination of the photographing apparatuses having the highest total point value is employed. An example of such selection processing will be specifically explained below.

Figure 9:
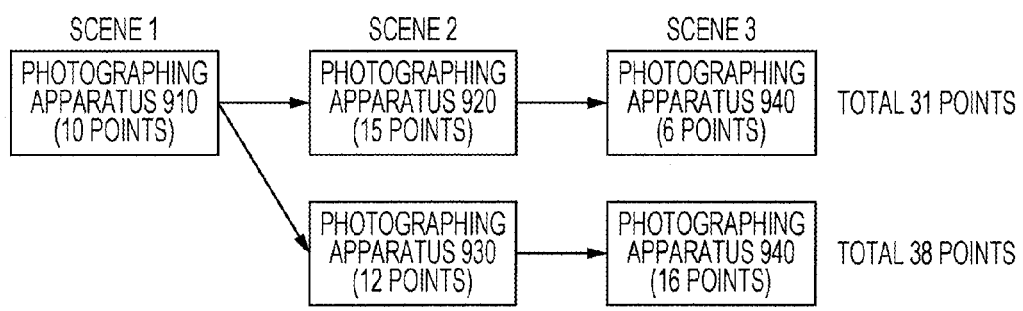
FIG. 9 illustrates exemplary selection processing of the embodiment of the invention.

FIG. 9 illustrates an example of selection processing of an embodiment of the invention. If at first a photographing apparatus 910 is selected for a scene 1, which is one of consecutive scenes 1, 2 and 3, it is supposed that, in the case of the scene 2, that a calculation result of 15 points is obtained for the photographing apparatus 920, and 12 points for the photographing apparatus 930.

Then, in the case of the scene 3, it is supposed that a calculation result of six points is obtained for the photographing apparatus 940 if the photographing apparatus 920 is selected on the scene 2, and that a calculation result of 16 points is obtained for the photographing apparatus 940 if the photographing apparatus 930 is selected on the scene 2.

As a result, if the total point value for the scenes 1 and 2 are calculated, the total point value upon the photographing apparatuses 910 and 920 being selected in this order (upper row) is 25 points, and the total point value upon the photographing apparatuses 910 and 930 being selected in this order (lower row) is 22 points. The total point value for the upper row is higher.

If the total point value for the scenes 1 through 3 is calculated, though, the total point value upon the photographing apparatuses 910, 920 and 940 being selected in this order (upper row) is 31 points, and the sum of the points upon the photographing apparatuses 910, 930 and 940 being selected in this order (lower row) is 38 points. The total point value on the lower row is higher on the scenes 1 through 3, and the selection on the lower row is finally employed in this case. Owing to such a configuration, output image data which better matches the expectation conditions as a whole is produced.

Further, the embodiment described above indicates a configuration such that the image composition candidate information is produced on the basis of the photographing target information, the object state information and the expectation condition information. The invention is not limited to this, though, and for example a configuration such as one produced on the basis of photographic image data practically obtained by the photographing apparatuses 200, 300 and 400 and the photographing target information acquired by the photographic image data acquisition section 180 is acceptable.

Incidentally, the operations of the information processing apparatus 100 described here are implemented by running a program stored in the storage section 112. The program can be provided via communication, and can be housed in a computer-readable storage medium such as a CD-ROM, so as to be provided.

The invention claimed is:

1. An information processing apparatus comprising:
a processor configured to:
acquire expectation condition information which indicates a plurality of expectation conditions for a photographic image, each of the plurality of expectation conditions having a priority among the plurality of expectation conditions;
acquire requisite condition information which indicates a requisite condition for the photographic image; and
select one or more of a plurality of photographing apparatuses which capture the photographic image satisfying an expectation condition having a highest priority and satisfying the requisite condition information, among the plurality of photographing apparatuses,
wherein
the selecting includes:
determining whether a photographic image captured by each of the plurality of photographing apparatuses satisfies at least one of the plurality of expectation conditions or not; and
determining whether or not a photographic image that has been determined to satisfy at least one of the plurality of expectation conditions by the processor satisfies the requisite condition;
the processor is configured to impart a weighting to each of the plurality of expectation conditions,
the processor is configured to determine, for a photographic image captured by each of the plurality of photographing apparatuses, a sum of the weightings imparted to the plurality of expectation conditions, and
the processor is further configured to determine whether or not a photographic image, that has been determined by the processor that the sum of the weightings is largest, satisfies the requisite condition, wherein
the processor is further configured to determine, for a plurality of consecutive scenes captured by each of a plurality of combinations of the plurality of photographing apparatuses, a sum of the weightings, and
the processor is further configured to determine whether or not each of the photographic images of the plurality of consecutive scenes captured by a combination of the plurality of photographing apparatuses, that has been determined by the processor that the sum of the weightings is largest, satisfies the requisite condition.

2. The information processing apparatus according to claim 1, wherein:
the processor is further configured to select at least one of the plurality of photographing apparatuses on the basis of the requisite condition information; and
the processor is configured to perform the determining whether a photographic image captured by each of the plurality of photographing apparatuses satisfies at least one of the plurality of expectation conditions or not for a photographic image captured by one or more of the photographing apparatuses selected by the processor.

3. The information processing apparatus according to claim 1, wherein:
the processor is configured to select one of the plurality of photographing apparatuses upon a predefined condition being satisfied.

4. The information processing apparatus according to claim 1, wherein:
the processor is configured to successively select one of the plurality of photographing apparatuses; and
the plurality of expectation conditions include a condition based on a relationship between the object state information and photographing apparatus state information on a most recently selected photographing apparatus.

5. An information processing system comprising:
a processor configured to:
acquire expectation condition information which indicates a plurality of expectation conditions for a photographic image, each of the plurality of expectation conditions having a priority among the plurality of expectation conditions;
acquire requisite condition information which indicates a requisite condition for the photographic image; and
select from a plurality of photographing apparatuses one or more of the plurality of photographing apparatuses which capture the photographic image satisfying an expectation condition having a highest priority and satisfying the requisite condition information, among the plurality of photographing apparatuses wherein
the selecting includes:
determining whether a photographic image captured by each of the plurality of photographing apparatuses satisfies at least one of the plurality of expectation conditions or not; and
determining whether or not a photographic image that has been determined to satisfy at least one of the plurality of expectation conditions by the processor satisfies the requisite condition;
the processor is configured to impart a weighting to each of the plurality of expectation conditions,
the processor is configured to determine, for a photographic image captured by each of the plurality of photographing apparatuses, a sum of the weightings imparted to the plurality of expectation conditions, and
the processor is further configured to determine whether or not a photographic image, that has been determined by the processor that the sum of the weightings is largest, satisfies the requisite condition, wherein
the processor is further configured to determine, for a plurality of consecutive scenes captured by each of a plurality of combinations of the plurality of photographing apparatuses, a sum of the weightings, and
the processor is further configured to determine whether or not each of the photographic images of the plurality of consecutive scenes captured by a combination of the plurality of photographing apparatuses, that has been determined by the processor that the sum of the weightings is largest, satisfies the requisite condition.

6. A non-transitory computer readable medium storing a program causing a computer to:
acquire expectation condition information which indicates a plurality of expectation conditions for a photographic image, each of the plurality of expectation conditions having a priority among the plurality of expectation conditions;
acquire requisite condition information which indicates a requisite condition for the photographic image; and
select from a plurality of photographing apparatuses one or more of the plurality of photographing apparatuses which capture the photographic image satisfying an expectation condition having the highest priority and satisfying the requisite condition information, among the plurality of photographing apparatuses wherein
the selecting includes:
determining whether a photographic image captured by each of the plurality of photographing apparatuses satisfies at least one of the plurality of expectation conditions or not; and
determining whether or not a photographic image that has been determined to satisfy at least one of the plurality of expectation conditions by the processor satisfies the requisite condition;
imparting a weighting to each of the plurality of expectation conditions,
determining, for a photographic image captured by each of the plurality of photographing apparatuses, a sum of the weightings imparted to the plurality of expectation conditions, and
determining whether or not a photographic image, that has been determined by the processor that the sum of the weightings is largest, satisfies the requisite condition, wherein
determining, for a plurality of consecutive scenes captured by each of a plurality of combinations of the plurality of photographing apparatuses, a sum of the weightings, and
determining whether or not each of the photographic images of the plurality of consecutive scenes captured by a combination of the plurality of photographing apparatuses, that has been determined that the sum of the weightings is largest, satisfies the requisite condition.

7. An information processing apparatus comprising:
a processor configured to:
acquire expectation condition information which indicates a plurality of expectation conditions for a photographic image;
acquire requisite condition information which indicates a requisite condition for the photographic image; and
select one or more of a plurality of photographing apparatuses which capture the photographic image on the basis of the expectation condition information and the requisite condition information,
wherein
the selecting includes:
determining whether a photographic image captured by each of the plurality of photographing apparatuses satisfies at least one of the plurality of expectation conditions or not; and
determining whether or not a photographic image that has been determined to satisfy at least one of the plurality of expectation conditions by the processor satisfies the requisite condition;
the processor is configured to impart a weighting to each of the plurality of expectation conditions,
the processor is configured to determine, for a photographic image captured by each of the plurality of photographing apparatuses, a sum of the weightings imparted to the plurality of expectation conditions, and the processor is further configured to determine whether or not a photographic image, that has been determined by the processor that the sum of the weightings is largest, satisfies the requisite condition, wherein the processor is further configured to determine, for a plurality of consecutive scenes captured by each of a plurality of combinations of the plurality of photographing apparatuses, a sum of the weightings, and the processor is further configured to determine whether or not each of the photographic images of the plurality of consecutive scenes captured by a combination of the plurality of photographing apparatuses, that has been determined by the processor that the sum of the weightings is largest, satisfies the requisite condition.

8. The information processing apparatus according to claim 1, wherein the processor is configured to select the one or more of the plurality of photographing apparatuses only if a predefined condition is satisfied, in which the predefined condition is one of the following cases:

a case where a photographing target is changed;

a case where a position of at least one of the plurality of objects is changed by a predefined amount or more;

a case where a content or a priority order of the plurality of expectation conditions is changed; and a case where a predefined lapse of time has passed since the selecting of one or more of the plurality of photographing apparatuses was lastly carried out.

9. The information processing apparatus according to claim 1, wherein the processor is further configured to:

acquire photographing apparatus state information including information which indicates positions and orientations of a plurality of photographing apparatuses; and acquire object state information including information which indicates positions of a plurality of objects.

10. The information processing system according to claim 5, wherein the processor is further configured to:

acquire photographing apparatus state information including information which indicates positions and orientations of a plurality of photographing apparatuses; and acquire object state information including information which indicates positions of a plurality of objects.

11. The non-transitory computer readable medium according to claim 6, the program stored thereon further causing the computer to:

acquire photographing apparatus state information including information which indicates positions and orientations of a plurality of photographing apparatuses; and acquire object state information including information which indicates positions of a plurality of objects.

12. The information processing apparatus according to claim 7, wherein the processor is further configured to:

acquire photographing apparatus state information including information which indicates positions and orientations of a plurality of photographing apparatuses; and acquire object state information including information which indicates positions of a plurality of objects.

* * * * *